US008568865B2

(12) United States Patent
Nun et al.

(10) Patent No.: US 8,568,865 B2
(45) Date of Patent: Oct. 29, 2013

(54) CERAMIC COMPOSITE WALL COVERING (75) Inventors: Edwin Nun, Billerbeck (DE); Marie-Theres Wilkes, Dorsten (DE); Hannelore Armoneit, Recklinghausen (DE); Sigrid Banken, Dorsten (DE); Volker Hennige, Dülmen (DE); Christian Hying, Rhede (DE); Gerhard Geipel, Haltern am See (DE); Norbert Kern, Haltern am See (DE); Eckart Berendes, Marl (DE); Christian Herkt-Bruns, Münster (DE); Andreas Gutsch, Lüdinghausen (DE)

(73) Assignee: Evonik Degussa GmbH, Essen (DE)

( * ) Notice: Subject to any disclaimer, the term of this patent is extended or adjusted under 35 U.S.C. 154(b) by 1151 days.

(21) Appl. No.: 10/588,952

(22) PCT Filed: Dec. 17, 2004

(86) PCT No.: PCT/EP2004/053577
§ 371 (c)(1),
(2), (4) Date: Apr. 25, 2007

(87) PCT Pub. No.: WO2005/080684
PCT Pub. Date: Sep. 1, 2005

(65) Prior Publication Data
US 2008/0020190 A1   Jan. 24, 2008

(30) Foreign Application Priority Data

Feb. 10, 2004   (DE) .......................... 10 2004 006 612

(51) Int. Cl.
*B32B 5/00*   (2006.01)
*B32B 18/00*   (2006.01)

(52) U.S. Cl.
USPC ............. 428/210; 428/98; 428/446; 428/448; 428/688

(58) Field of Classification Search
USPC ............................ 428/210, 446, 688, 98, 448
See application file for complete search history.

(56) References Cited

U.S. PATENT DOCUMENTS

| | | | |
|---|---|---|---|
| 3,252,917 A | 5/1966 | Mindick et al. | |
| 4,215,168 A | 7/1980 | Yonemura et al. | |
| 6,096,173 A | 8/2000 | Von Hippel et al. | |
| 6,299,668 B1 | 10/2001 | Penth et al. | |
| 6,299,778 B1 | 10/2001 | Penth et al. | |
| 6,309,545 B1 * | 10/2001 | Penth et al. | 210/500.25 |
| 6,340,379 B1 | 1/2002 | Penth et al. | |
| 6,383,386 B1 | 5/2002 | Hying et al. | |
| 6,458,750 B1 | 10/2002 | Dardin et al. | |
| 6,620,320 B1 | 9/2003 | Hying et al. | |
| 6,828,381 B1 * | 12/2004 | Armbrust et al. | 525/100 |
| 6,841,075 B2 | 1/2005 | Penth et al. | |
| 7,083,828 B2 | 8/2006 | Mueller et al. | |
| 7,235,298 B2 | 6/2007 | Katusic et al. | |
| 7,288,501 B2 | 10/2007 | Auer et al. | |
| 7,374,743 B2 | 5/2008 | Katusic et al. | |
| 7,575,832 B2 | 8/2009 | Hennige et al. | |
| 7,682,731 B2 | 3/2010 | Hennige et al. | |
| 7,691,528 B2 | 4/2010 | Hennige et al. | |
| 7,691,529 B2 | 4/2010 | Hennige et al. | |
| 7,790,321 B2 | 9/2010 | Hennige et al. | |
| 7,807,286 B2 | 10/2010 | Hennige et al. | |
| 7,892,673 B2 | 2/2011 | Hennige et al. | |
| 8,016,896 B2 | 9/2011 | Hennige et al. | |
| 8,053,102 B2 | 11/2011 | Hennige et al. | |
| 2001/0036437 A1 | 11/2001 | Gutsch et al. | |
| 2001/0055639 A1 | 12/2001 | Moritz et al. | |
| 2002/0023419 A1 | 2/2002 | Penth et al. | |
| 2003/0206854 A1 | 11/2003 | Gutsch et al. | |
| 2004/0028913 A1 | 2/2004 | Hennige et al. | |
| 2004/0038105 A1 | 2/2004 | Hennige et al. | |
| 2004/0154106 A1 | 8/2004 | Oles et al. | |
| 2005/0031942 A1 | 2/2005 | Hennige et al. | |
| 2005/0070193 A1 | 3/2005 | Hennige et al. | |
| 2005/0084761 A1 | 4/2005 | Hennige et al. | |
| 2005/0087491 A1 | 4/2005 | Hennige et al. | |
| 2005/0103457 A1 | 5/2005 | Nun et al. | |
| 2005/0221192 A1 | 10/2005 | Hennige et al. | |
| 2006/0049376 A1 | 3/2006 | Nun et al. | |
| 2006/0078791 A1 | 4/2006 | Hennige et al. | |
| 2006/0128239 A1 | 6/2006 | Nun et al. | |
| 2006/0141223 A1 | 6/2006 | Oles et al. | |
| 2006/0147675 A1 | 7/2006 | Nun et al. | |
| 2006/0156475 A1 | 7/2006 | Oles et al. | |
| 2006/0172641 A1 | 8/2006 | Hennige et al. | |
| 2006/0222815 A1 | 10/2006 | Oles et al. | |
| 2007/0175362 A1 | 8/2007 | Gutsch et al. | |

(Continued)

FOREIGN PATENT DOCUMENTS

| | | |
|---|---|---|
| DE | 11 12 940 | 8/1961 |
| DE | 38 37 397 | 5/1990 |

(Continued)

OTHER PUBLICATIONS

U.S. Appl. No. 11/572,548, filed Jan. 23, 2007, Nun, et al.
U.S. Appl. No. 11/578,664, filed Oct. 18, 2006, Hoerpel, et al.
U.S. Appl. No. 10/575,759, filed Apr. 13, 2006, Hennige, et al.
U.S. Appl. No. 10/575,734, filed Apr. 13, 2006, Hoerpel, et al.
U.S. Appl. No. 10/575,274, filed Apr. 11, 2006, Hennige, et al.
U.S. Appl. No. 12/067,855, filed Mar. 24, 2008, Nun, et al.
U.S. Appl. No. 12/092,086, filed Apr. 30, 2008, Nun, et al.

(Continued)

*Primary Examiner* — Matthew Matzek
(74) *Attorney, Agent, or Firm* — Oblon, Spivak, McClelland, Maier & Neustadt, L.L.P.

(57) ABSTRACT

Disclosed is a wallcovering assembly consisting of a base material and at least one ceramic coating/topcoat with or without an optional ceramic interlayer.

8 Claims, 1 Drawing Sheet

(56) References Cited

U.S. PATENT DOCUMENTS

| | | | |
|---|---|---|---|
| 2007/0184993 A1 | 8/2007 | Scherer et al. |
| 2007/0213237 A1 | 9/2007 | Scherer et al. |
| 2007/0219101 A1 | 9/2007 | Scherer et al. |
| 2008/0032197 A1 | 2/2008 | Horpel et al. |
| 2008/0084686 A1 | 4/2008 | Gutsch et al. |
| 2008/0190841 A1 | 8/2008 | Pascaly et al. |
| 2009/0078485 A1 | 3/2009 | Gutsch et al. |
| 2009/0269489 A1 | 10/2009 | Hennige et al. |
| 2010/0000079 A1 | 1/2010 | Horpel et al. |
| 2010/0003401 A1 | 1/2010 | Horpel et al. |
| 2010/0279173 A1 | 11/2010 | Hying et al. |
| 2011/0206971 A1 | 8/2011 | Hennige et al. |

FOREIGN PATENT DOCUMENTS

| | | |
|---|---|---|
| DE | 41 34 540 | 4/1992 |
| DE | 198 05 672 | 8/1999 |
| DE | 100 60 776 | 6/2002 |
| DE | 101 35 667 | 2/2003 |
| DE | 101 36 456 | 2/2003 |
| DE | 101 42 622 | 3/2003 |
| DE | 101 56 619 | 5/2003 |
| DE | 101 56 622 | 5/2003 |
| DE | 103 01 754 | 11/2003 |
| EP | 1 314 695 | 5/2003 |
| JP | 01-006198 | 1/1989 |
| JP | 5-156055 | 6/1993 |
| JP | 2001-159099 | 6/2001 |
| JP | 2003-013372 | 1/2003 |
| WO | 98/51747 | 11/1998 |
| WO | 99/15262 | 4/1999 |
| WO | WO 0116242 A1 * | 3/2001 |

OTHER PUBLICATIONS

U.S. Appl. No. 12/092,084, filed Apr. 30, 2008, Nun, et al.
U.S. Appl. No. 12/159,103, filed Jun. 25, 2008, Nun, et al.
U.S. Appl. No. 12/194,321, filed May 20, 2008, Nun, et al.
U.S. Appl. No. 12/093,025, filed May 8, 2008, Nun, et al.
U.S. Appl. No. 12/161,031, filed Jul. 16, 2008, Nun, et al.
Agaskar, Pradyot A., "Functionalised spherosilicates: soluble precursors of inorganic/organic hybrid materials", Colloids and Surfaces, vol. 63, pp. 131-138, 1992.
Deutsche Norm: DIN EN 13523-4, pp. 1-6, Dec. 2001.
Deutsche Norm: DIN 53483, pp. 1-3, Jul. 1969.
Deutsche Norm: DIN 53438, Part 3, pp. 1-3, Jun. 1984.
Harrison, Philip G. et al., "High Yield Routes to Hexa (Dimethylsilyloxy) Silsesquioxane and Hexa (Bromodimethylsilyloxy) Silsesquioxane", Main Group Metal Chemistry, vol. 20, No. 3, pp. 137-141, 1997.
Hoebbel, Von D. et al., "Die Konstitution des Tetramethylammoniumsilicats der Zusammensetzung 1, 0 N (CH3)4 OH. 1, 0 SiO2. 8, 0-8, 3 H2 O", Z. anorg. Allg. Chem., vol. 384, pp. 43-52, 1971.
U.S. Appl. No. 10/575,268, filed Apr. 11, 2006, Hennige, et al.
U.S. Appl. No. 60/021,600, filed Jul. 11, 1996, Riemenschneider, et al.
U.S. Appl. No. 08/842,775, filed Apr. 17, 1997, Riemenschneider, et al.
U.S. Appl. No. 09/441,439, filed Nov. 17, 1999, Barthold, et al.
U.S. Appl. No. 60/194,367, filed Apr. 4, 2002, Michael, et al.
U.S. Appl. No. 12/746,683, filed Jun. 7, 2010, Hedrich, et al.
U.S. Appl. No. 13/266,940, filed Oct. 28, 2011, Pascaly, et al.

* cited by examiner

CERAMIC COMPOSITE WALL COVERING

The present invention concerns a wallcovering assembly consisting of a base material and at least one sealing layer (top layer), wherein a ceramic interlayer may optionally be present, and also a process for its production.

Wallcovering assemblies (wallpapers) are commercially available in a multiplicity of different variations. They differ in structure, in the materials from which they are produced and in their properties.

Wallcovering assemblies (wallpapers) consist in general of paper or plastic and are colored, partly printed with patterns and partly provided with textures. The different wallpapers are subdivided into, for example, size print, velvet, woodchip, embossed or textured wallpapers on the basis of the materials and manufacturing conditions used.

In addition, wallpapers having specific properties are known from the prior art. For instance, DE 198 05 672 discloses fully compostible wallcovering assemblies. Wallpapers having a layer of plastic at the surface, which are washable and easier to clean as a result, are known from DE 195 30 508 for example. The stability of such wallpapers is frequently very low, which is why they are in particular usually scratched by the paws of pets or by children's toys/fingernails.

Wallcovering assemblies which have become more prominent over the last 10 years have a microbicidal and germicidal effect. They are disclosed in DE 101 35 667 and DE 101 36 456 for example. The disinfecting wallpapers disclosed in DE 41 34 540 contain specific bioceramic compositions which are doped with specific metals from the group consisting of silver, copper and zinc.

Modern wallcovering assemblies are being more and more widely used. In addition, increasing automation and the use of machines in the processing of wallcovering assemblies means that the assemblies have to meet more and more specific requirements. At the same time, wallcovering assemblies shall provide scope for a wide variety of design possibilities and be inexpensive. There is thus a constant demand for novel wallcovering assemblies. Novel wallcovering assemblies should ideally be easy to handle, yet possess good durability. Except for glass fiber wallpapers, all flexible wallcovering assemblies have poor fire ratings.

The present patent application therefore has for its object to provide wallcovering assemblies having good scratch resistance, good washability and/or improved fire behavior. It further has for its object to provide a process for producing wallcovering assemblies.

We have found that this object is achieved, surprisingly and impressively, by wallcovering assemblies as defined in the claims and also produced as per a process as defined in the claims.

The present invention accordingly provides a wallcovering assembly comprising a base material (1) and at least one ceramic coating (2) comprising ceramic particles selected from the oxides, nitrides, borides or carbides of the metals or semimetals embedded in a matrix consisting of a silicon network linked together by Si—O—Si bridges.

The present invention likewise provides a process for producing inventive wallcovering assemblies, which comprises a suspension comprising ceramic particles suspended in a polymeric sol produced by mixing at least one silane with an alcohol and an acid being applied to a base material directly or after application of one or more interlayers and subsequently solidified.

One advantage of the inventive wallcovering assemblies is their improved fire behavior in that they achieve a DIN 53 483 Part 3 fire protection class rating of F1.

A further advantage of the present invention is that the use of anatase in the ceramic coating may provide the inventive wallpapers with germicidal activities due to photocatalytic effects—without the need for free metal ions.

The inventive wallcovering assemblies are likewise advantageous because of their higher mechanical durability. For instance, the inventive assemblies exhibit particularly good scratch resistance. The inventive assemblies can therefore be used especially for covering walls in public buildings, but also for covering the walls of articles, for example backs of seats in public means of transport or inner surfaces of means of transport.

A further advantage of the inventive wallcovering assemblies is that they can be embodied to be very substantially resistant to chemicals, water resistant and washable.

The processing properties of the inventive wallcovering assemblies are better than those of conventional paper type wallpapers, since they are less prone to break.

Depending on the kind of topcoat used, the inventive ceramic wallpapers can have been endowed with very different surface properties, so that these wallpapers can have very different topcoat layers for different uses.

Transparent topcoat layers are able to protect decorative layers applied atop the ceramic layer (2) against damage or other external influences. Especially when transparent ceramic coatings are used, the surfaces of such wallpapers are very scratch, scuff and abrasion resistant. The ceramic coating also entails further advantages. Especially the fire behavior of sheetlike structures equipped with ceramic coatings is distinctly improved compared with the product not coated with ceramic. For instance, a native paper type wallcovering coated according to the present invention is self-extinguishing. This corresponds to UL fire class F1.

The inventive wallcovering assemblies will now be described without the invention being restricted to these embodiments. In the realm of the present invention, the terms "wallcovering assembly" and "wallpaper" shall be equivalent, and both are used to designate the inventive entity.

The inventive wallcovering assembly comprises a base material (1) and at least one ceramic coating (2) comprising ceramic particles selected from the oxides, nitrides, borides or carbides of the metals or semimetals embedded in a matrix consisting of a silicon network linked together by Si—O—Si bridges. The embedded particles are fully enrobed by the matrix.

The base material (1) can be at least a nonwoven, a woven, a formed-loop knit, a felt or a film or an assembly which contains a nonwoven, a woven, a formed-loop knit, a felt or a film. Preferably, the base material is a sheetlike structure comprising predominantly cellulose fibers, polymeric fibers, glass fibers, metal fibers or ceramic fibers, or is a polymeric film. Suitable sheetlike structures can be for example woven metal fabrics, such as woven steel or copper fabrics for example, polymeric nonwovens or wovens or single- or multi-layered papery materials. The paper can be wood containing or wood free. Similarly, the base can be a commercially available wallpaper, for example a woodchip wallpaper, a vinyl wallpaper or a photographic wallpaper. Placards or advertising posters are also useful as base materials. The thickness of the base material is not critical, although the thickness is preferably chosen such that the base material has sufficient flexibility/bendability in order that the inventive wallpaper is likewise bendable and flexible, respectively.

When the base material consists of multilayered paper, the individual papery layers can have been bonded together using all known methods. For instance, the layers may have been for example subjected to a dry or wet lamination or pressed together with or without use of an adhesive. The papery plies may have been bonded to each other not only wet but also dry. Interlayers containing adhesion promoters or adhesives or other binders can be present between the individual papery plies.

The silicon network of the ceramic coating (2), which forms the matrix, can be a purely inorganic network, which is formed via the oxygen bridges, or else an inorganic-organic network. Such an inorganic-organic silicon network comprises organic radicals which are bound to the silicon. Depending on the nature of the radicals these can in turn be bound together or one organic radical can be bound to two or more silicon atoms. Preferably, in each case at least two organic radicals are bound together via covalent bonds. Depending on the compounds used in the preparation of the layer, two such organic radicals which are linked via a covalent bond may comprise for example a structural unit as per formula I

—$C_3H_6$—O—$CH_2$—CH(OH)—$CH_2$—NH—$C_3H_6$—   I

Such a structural unit is obtained for example by reacting the silanes AMEO (3-aminopropyltriethoxysilane) and GLYEO (3-glycidyloxypropyltriethoxysilane). Structural units present preferably further include those which are obtained by reaction of the UV-crosslinking silane MEMO (3-methacryloyloxypropyltrimethoxysilane) with itself or by reaction of GLYMO (3-glycidyloxypropyltrimethoxysilane) and AMEO.

In a particularly preferred embodiment of the inventive assembly, the silicon atoms are at least partly bound together via an organic radical which comprises a structural unit as per the formula II where $R^{10}$ is an organic radical, especially a substituted or unsubstituted alkyl, aryl, acyl or alkylaryl radical. $R^{10}$ is more preferably a dimethylmethylene radical. Such a structural unit is obtainable for example on reacting bisphenol A with the silanes (ethoxysilanes).

The particles embedded in the matrix of the ceramic coating (2) preferably have an average particle size from 1 nm to 1 μm for the elementary particles. The particles can be pyrogenic or crystalline particles. When pyrogenic particles such as pyrogenic silicas for example are embedded in the matrix, they preferably have an average particle size from 1 to 50 nm and preferably from 5 to 25 nm for the primary particles. When crystalline particles are present, an example being alumina from Martinswerke, they preferably have an average particle size from 50 nm to 1 μm and more preferably from 100 to 500 nm. Pyrogenic particles refers to particles obtained by flame pyrolysis. Crystalline particles refers to particles which are obtained by crystallization from solutions, melts or the vapor phase or else by grinding operations on mineral materials.

Particularly preferred particles embedded in the matrix are particles of oxides of the elements Al, Zr, Si, Ti, Ce or Fe. The particularly preferred particles are POSS clusters or hydrophobicized silicas as available for example from Degussa under the designation Aerosil, Aeroxide, Alumininmoxid or Titandioxid P25. POSS clusters refers to polyhedral oligomeric silicon-oxygen clusters as per the formula III

[$(R_aX_bSiO_{1.5})_m(R_cX_dSiO)_n(R_eX_fSi_2O_{2.5})_o$
$(R_gX_hSi_2O_2)_p$]   III where:
a, b, c=0-1; d=1-2; e, g, f=0-3; h=1-4;
m+n+o+p≥4; a+b=1; c+d=2; e+f=3 and g+h=4;
R=hydrogen atom, alkyl, cycloalkyl, alkenyl, cycloalkenyl, alkynyl, cycloalkynyl, aryl, heteroaryl group or polymer unit, which are in each case substituted or unsubstituted, or further functionalized polyhedral oligomeric silicon-oxygen cluster units which are attached via a polymer unit or a bridging unit, X=oxy, hydroxyl, alkoxy, carboxyl, silyl, alkylsilyl, alkoxysilyl, siloxy, alkylsiloxy, alkoxysiloxy, silylalkyl, alkoxysilylalkyl, alkylsilylalkyl, halogen, epoxy, ester, fluoroalkyl, isocyanate, blocked isocyanate, acrylate, methacrylate, nitrile, amino, phosphine group or substituents of the type R containing at least one such group of the type X, the substituents of the type R being identical or different and the substituents of the type X being identical or different.

Silasesquioxanes are oligomeric or polymeric substances whose fully condensed representatives possess the general formula $(SiO_{3/2}R)_n$, where n≥4 and the radical R can be a hydrogen atom but is usually an organic radical, and constitute a special case of the POSS clusters. The smallest structure of a silasesquioxane is the tetrahedron. Voronkov and Lavrent'yev (Top. Curr. Chem. 102 (1982), 199-236) describe the synthesis of fully condensing completely condensed oligomeric silasesquioxanes by hydrolytic condensation of trifunctional $RSiY_3$ precursors, where R represents a hydrocarbyl radical and Y is a hydrolyzable group, for example chloride, alkoxide or siloxide. Lichtenhan et al. describe the base-catalyzed preparation of oligomeric silasesquioxanes (WO 01/10871). Silasesquioxanes of the formula $R_8Si_8O_{12}$ (with identical or different hydrocarbyl radicals R) can be reacted under base catalysis to functionalized; incompletely condensed silasesquioxanes, such as for example $R_7Si_7O_9(OH)_3$ or else $R_8Si_8O_{11}(OH)_2$ and $R_8Si_8O_{10}(OH)_4$ (Chem. Commun. (1999), 2309-10; Polym. Mater. Sci. Eng. 82 (2000), 301-2; WO 01/10871) and thus can serve as a parent compound for a multiplicity of different incompletely condensed and functionalized silasesquioxanes. The silasesquioxanes (trisilanols) of the formula $R_7Si_7O_9(OH)_3$ in particular can be converted into correspondingly modified oligomeric silasesquioxanes by reaction with functionalized monomeric silanes (corner capping).

Oligomeric spherosilicates have a similar construction to oligomeric silasesquioxanes. They too possess a "cagelike" structure. Unlike silasesquioxanes, owing to the method by which they are prepared, the silicon atoms at the corners of a spherosilicate are connected to a further oxygen atom, which in turn is further substituted. Oligomeric spherosilicates can be prepared by silylating suitable silicate precursors (D. Hoebbel, W. Wieker, Z. Anorg. Allg. Chem. 384 (1971), 43-52; P. A. Agaskar, Colloids Surf. 63 (1992), 131-8; P. G. Harrison, R. Kannengiesser, C. J. Hall, J. Main Group Met. Chem. 20 (1997), 137-141; R. Weidner, Zeller, B. Deubzer, V. Frey, Ger. Offen. (1990), DE 38 37 397).

It will be appreciated that the ceramic coating can contain all aforementioned kinds of particles alone or as a mixture of the various particles.

Suitable polyhedral silsesquioxanes are obtainable for example from Hybrid Plastics, Fountain Valley, USA. Processes for preparing POSS clusters are discernible for example from DE 100 60 776, DE 101 56 622, DE 101 56 619 or DE 103 01 754.

The ceramic coating (2), which forms the uppermost layer of the inventive assembly (top layer) on at least one side of the assembly, are preferably less than 100 µm, preferably from 50 nm to 100 µm, more preferably from 100 nm to 20 µm and most preferably from 1 to 10 µm in thickness. The thickness of the layer naturally depends on the average particle size of the particles used and hence must always be larger than the average particle size of the particles used.

It may be advantageous for the ceramic coating (2) to be transparent to electromagnetic radiation having a wavelength in the region of visible light. This ensures that information items which are present on layers underneath the ceramic coating, examples being patterns, photographs, drawings or text, remain visible through the ceramic coating. For such a transparency the particles present in the matrix have to be smaller in size than the wavelength of visible light.

The ceramic coating (2) present as a top layer in the inventive wallcovering assembly may have different properties depending on the properties desired for the surface of the inventive assembly, and may comprise further or certain materials for this purpose. When the ceramic coating is to be, for example, opaque or colored in a certain hue, the ceramic coating may additionally comprise pigments or dyes for example. When the ceramic coating is photocatalytically active, it preferably comprises anatase particles at the surface. When the ceramic coating is to be pervious to gaseous materials, it preferably comprises no organic radicals. Combinations of these properties are possible as well, in which case the ceramic coating then comprises a combination of different substances.

The ceramic coating and hence the inventive assembly composite is impervious to water. Impervious to water is to be understood as meaning that water under a hydrohead of 1 m will not pass through the ceramic layer under normal conditions. A high water imperviousness is achieved when the particles used are very small in size and preferably have hydrophobic properties. Thus endowed inventive assemblies can be water impervious up to a hydrohead of 2 m and preferably even 5 m.

The assembly surface, which is realized through the ceramic coating, may be smooth or rough. Roughness may be due to elevations due to the particles in the matrix or else result from elevations which are present in the base material or in the layer which is present under the ceramic coating.

As already indicated, the inventive wallcovering assembly may comprise one or more interlayers between the base material (1) and the ceramic layer (2). Such interlayers may contain for example one or more components selected from adhesives, adhesion promoters, binders, dyes and pigments. Printing inks especially make it possible, for example, to print decors directly onto the base material or onto a layer under the ceramic coating. The interlayers may comprise in particular adhesives, adhesion promoters or binders when they are provided to improve the bonding between the surrounding layers. It may be advantageous but is not a mandatory prerequisite that the ceramic coating (2) present as a top layer is bonded to the ceramic layer (2) by means of interlayers containing adhesion promoter or adhesive or the like. The interlayers may comprise printing inks and pigments in particular when these layers are used to reproduce patterns, script characters or images.

The inventive wallcovering assemblies may have been printed and colored, in which case a print onto the base material or onto the layer under the top layer is preferred, since this ensures protection of the decor.

In the inventive wallcovering assembly it may be particularly advantageous if, between the carrier material (1) and the ceramic coating (2), there is present a ceramic interlayer (3) containing particles of an inorganic component which comprises essentially at least one compound from at least one metal, at least one semimetal or at least one mixed metal with at least one element of the 3rd to 7th main group that are bonded by at least one inorganic adhesive to each other and to the layer present underneath the ceramic interlayer (3).

The ceramic material of the interlayer (3) preferably comprises at least one oxide of the metals Al, Zr, Si, Sn, Ti and/or Y and more preferably an oxide of the metals Al, Zr, Ti and/or Si as an inorganic component. These oxides may be not only the material of which the particles of the inorganic component consist but also the material of the inorganic adhesive. The oxides for the particles and the inorganic adhesive may be the same or different. Preferably, the particles and the inorganic adhesive consist of different oxides.

It may be advantageous when the interlayer, or the inorganic components which make up this interlayer, is bonded via adhesion promoters to an underlying layer or to the base material (1).

Typical adhesion promoters are organofunctional silanes as for example on offer from Degussa under the tradename "Dynasilan".

It is preferable for the interlayer (3) to comprise at least one inorganic component in a particle size fraction having an average particle size from 1 to 249 nm or having an average particle size from 250 to 10000 nm and more preferably from 250 to 1750 nm. It may be advantageous for an inventive wallcovering assembly to comprise an interlayer (3) which comprises at least two particle size fractions of one inorganic component at least. It may similarly be advantageous for the interlayer (3) to comprise at least two particle size fractions of two or more inorganic components. The particle size ratio may be in the range from 1:1 to 1:10000 and preferably in the range from 1:1 to 1:100. The quantitative ratio of the particle size fractions in the assembly composite can preferably be from 0.01:1 to 1:0.01.

In a further preferred embodiment, the ceramic interlayer (3) preferably comprises particles of oxides selected from $Al_2O_3$, $ZrO_2$, $Y_2O_3$, $TiO_2$ and/or $SiO_2$ having an average particle size from 200 nm to 5 µm, preferably from 0.5 to 2 µm, and a silicon network, the silicon of the network being bonded via oxygen atoms to the oxides of the ceramic coating, via organic radicals to the layer underneath the top layer and via at least one chain of carbon atoms to a further silicon.

In a particularly preferred embodiment, the ceramic interlayer (3) of the inventive wallcovering assembly comprises two fractions of oxides selected from $Al_2O_3$, $ZrO_2$, $TiO_2$, $Y_2O_3$ and/or $SiO_2$, the first fraction having been obtained from a sol and the second fraction comprising particles having an average particle size in the range from 200 nm to 5 µm and preferably from 0.5 to 2 µm and the first fraction being present as a layer on the particles of the second fraction and the first fraction comprising from 1 to 30 parts by mass of the coating, the second fraction being present in the ceramic coating at from 5 to 94 parts by mass of the coating and there also being present a network comprising silicon, the silicon of the network being bonded via oxygen atoms to the oxides or to a further silicon and via organic radicals (chain comprising carbon atoms) likewise to a further silicon, to the material of an underlying layer or to the base material. The chain which comprises carbon atoms preferably also comprises at least one nitrogen atom. Preferably, the inventive ceramic interlayer (3) comprises a network which comprises silicon and in which the chains by which the silicon atoms are connected to each other via carbon atoms, through silicon atoms connected by chains comprising nitrogen, was obtained by addition of an amino group onto a glycidyl group. Owing to these chains between the silicon atoms, there is not only an inorganic network formed via Si- or metal-oxygen bridges but also a second, organic network which is reticulated with the first, inorganic network and which significantly augments the stability of the ceramic interlayer, including against water in particular.

The ceramic interlayer (3) may be embodied to comprise particles and especially particles having an average particle size of less than 20 nm as a first ceramic fraction. Such a ceramic fraction may have been produced via a particulate sol for example. In another preferred embodiment of the inventive membrane the ceramic fraction contains particles or a polymerlike inorganic network which have been produced via a polymeric sol. The ceramic fraction preferably has a layer thickness of less than 100 nm and more preferably less than 50 nm on the surface of the particles of the second fraction. The second fraction of the particles preferably has a BET surface area of less than 5 m$^2$/g.

The inventive wallcovering assemblies are preferably flexible and are preferably bendable without damage down to any radius down to 20 cm, preferably down to 5 cm and most preferably down to 10 mm. The good bendability of the inventive wallcovering assemblies has the advantage that the ceramic wallcovering assemblies are capable of withstanding mechanical stresses, tearing for example, without having to accept a loss of flexibility. The inventive wallcovering assemblies can be wound, stored, shipped and processed in roll form similarly to conventional wallcovering assemblies.

The inventive wallcovering assemblies can be produced by the inventive process, which comprises producing a final ceramic coating (2) by a suspension comprising ceramic particles suspended in a polymeric sol produced by mixing at least one silane with an alcohol and an acid being applied to a base material directly or after application of one or more interlayers and subsequently solidified. The suspension can be brought onto or optionally into the base material or any interlayer present by, for example, printing on, pressing on, pressing in, rolling on, knifecoating on, spreadcoating on, dipping, spraying or pouring on in the inventive process.

The thickness of the base material used is freely choosable, although the base material preferably has a flexibility or bendability which is equal or superior to the flexibility/bendability of the assembly to be produced. It is particularly preferable to use base materials as described in the description of the inventive wallcovering assembly.

All suitable particles can be used as ceramic particles. It is particularly preferable to use oxides, carbides, nitrides or borides of metals or semimetals as ceramic particles. Further particularly preferred particles such as POSS particles for example and also preferred particle sizes can be taken from the preceding description of the composite itself, which description is expressly incorporated at this point by reference. Again, mixtures of the various particles can be used as well.

The polymeric sols used for producing the suspension can be produced by hydrolysis of a silane. Polymeric sols are so called because the compounds formed by hydrolysis in the sol are present in polymeric form, i.e., in the form of chains crosslinked across a relatively large space. Polymeric sols customarily contain less than 50% by weight and preferably very much less than 20% by weight of water and/or aqueous acids. To obtain the preferred proportion of water and/or aqueous acid, the hydrolysis is preferably carried out in such a way that the silane to be hydrolyzed is hydrolyzed with from 0.5 to 10 times the molar ratio and preferably with half the molar ratio of water in the form of an aqueous acid, preferably an aqueous mineral acid or an aqueous organic acid, based on the hydrolyzable groups of the hydrolyzable compound. The aqueous acid used is preferably from 0.1% to 5% by weight and more preferably from 0.5% to 2% by weight. The amount of water used can be up to 10 times in the case of compounds which are very slow to hydrolyze, such as tetraethoxysilane for example. A hydrolysis with less than the preferred amount of water likewise leads to good results, although using more than 50% less than the preferred amount of half the molar ratio is possible but not very sensible, since hydrolysis would no longer be complete and coatings based on such sols would not be very stable.

To produce these polymeric sols, the silanes to be hydrolyzed are dissolved in an alcohol, especially ethanol, isopropanol, butanol or amyl alcohol, before the actual hydrolysis is carried out. The amount of alcohol used is chosen such that the suspension or sol obtained has a sufficiently high viscosity. Depending on the suspension viscosity requirements, which depend on the substrate to which the suspension is to be applied and/or the processing conditions, the amount of alcohol added can be varied. Larger amounts of alcohols (monoalcohols) can be added to lower the viscosity. The viscosity of the suspension can be increased by distilling off the alcohol solvent at room temperature under reduced pressure. It is further possible to set the viscosity via the amount of pyrogenic silicas, so-called Aerosils, added.

To obtain a very stable ceramic coating after solidifying, it will be advantageous for the weight ratio of silanes to particles used to be in the range from 1:1000 to 1:2 and preferably in the range from 1:100 to 1:10.

In a particular embodiment of the inventive process, the suspension can be solidified by heating when the sol is based on tetraethoxysilane (TEOS), 3-glycidyloxytrimethoxysilane (GLYMO) and/or 3-glycidyloxytriethoxysilane (GLYEO). It can be advantageous in this embodiment of the inventive process to use a suspension to which di- or polyols, especially di- or polyols which comprise aromatic groups, such as bisphenols for example and especially bisphenol A have been added. The addition of these di- or polyols ensures that the surface formed by the matrix after the suspension has been solidified has a particularly high water imperviousness. The di- and/or polyol content of an inventive suspension is preferably in the range from 5% to 50% by weight and more preferably in the range from 10% to 40% by weight.

In one variant of this embodiment, the suspension to be used is produced in two steps, a first step of initially producing a mixture of first silane, alcohol and acid, into which mixture the particles are stirred, and a second step of adding to this first component a further silane and/or a diol or polyol as a second component before the suspension is heated. This has the advantage that the sol obtained in the first step is pre-activated, but has a storage stability of preferably at least 30 days and more preferably up to 30 days. When the second component is added (curing component), the pot life is preferably at least 4 days. If, however, contrary to the preferred variant, the two silanes used are first mixed and then acidified, the pot life is below 4 days and generally below 2 days. It is particularly preferable for the suspension to be used to be produced in two steps, a first step of initially producing a mixture of GLYEO, alcohol and acid, into which mixture the particles are stirred, and a second step of this first component having added to it AMEO and/or a diol or polyol as a second component before the suspension is heated. This two-component system makes it possible to provide ready-produced mixtures of components 1 and 2 that have a certain stability in storage. Simply mixing the two components at the site of use provides in a simple way the ready-to-use mixture for producing the inventive topcoating layer.

The suspension may be heated for example at temperatures from 50 to 650° C., preferably 80 to 250° C. and most preferably 120 to 180° C. for 1 second to 2 hours, preferably for 10 seconds to 60 minutes and most preferably for 20 seconds to 30 minutes. The temperature can be freely chosen within the stated range, although the temperature should be chosen such that it is at least 5° C. below the melting, decomposition or softening temperature of the materials used as a base material or of the materials present in any interlayers present. The heating of the assembly may be effected by means of heated air, hot air, infrared radiation or by other heating methods according to the prior art.

In a further particular embodiment of the inventive process, the suspension can be solidified by treatment with UV rays when the sol is based on methacryloyloxypropyltrimethoxysilane (MEMO). The treatment with UV radiation can consist for example in the material to which the suspension was applied being exposed to sunlight or to the light of specific UV lamps. The treatment with UV radiation can be effected for example by means of a UV lamp, in which case the amount of energy received has to be sufficient to ensure crosslinking of the adhesion promoters.

Such a treatment can be effected for example by irradiation with a mercury vapor lamp having a wavelength of 254 nm for a period in the range from 0.1 to 24 hours and preferably in the range from 1 to 4 hours. It may be advantageous for a heating operation as described above to be carried out after or before the UV treatment, preferably before the UV treatment, in order that a sufficiently high final strength be achieved.

To obtain a sufficiently stable network, the suspension used for producing the topcoating layer (2) preferably comprises an adhesion promoter content in the range from 0.1 to 20 mass % and preferably in the range from 2 to 10 mass %. As well as the "reactive" adhesion promoters mentioned, the suspension may comprise further adhesion promoters selected from the organofunctional silanes. These adhesion promoters can likewise be present in the suspension at a fraction in the range from 0.1 to 20 mass % and preferably at a fraction in the range from 2 to 10 mass %. As well as adhesion promoters, there are further additives, for example 1-methylimidazole, which can be used as an activator when bisphenol A is used, which can be present in the suspension.

In the inventive process, one or more interlayers can be applied to the base material before the ceramic layer (2) is applied as a top layer. Such interlayers may contain for example an adhesive, an adhesion promoter or a binder. Such interlayers may likewise contain for example texture-conferring agents, such as for example foamed PVC or wood chips as for a woodchip wallpaper. Similarly, the application of patterns, photographs, text or drawings by printing with inks can constitute an applying of interlayers, which is why interlayers can also comprise printing inks.

In a particularly preferred embodiment of the inventive process, a ceramic interlayer is applied to the base material before the ceramic coating (2) is applied. This ceramic interlayer can be produced and applied in the same way as the ceramic coating. To this end, the base material which has been treated once according to the present invention and to which a ceramic coating has been applied is again endowed with a ceramic coating as per the inventive process, optionally after further interlayers have been applied.

In one variant of this embodiment of the inventive process, the interlayer is applied by applying and solidifying a suspension which comprises particles of an inorganic component suspended in a sol to the base material or further interlayers optionally present and subsequently solidifying the suspension on and optionally in the base material or the further interlayer optionally present.

The suspension for producing the ceramic interlayer can be brought onto and optionally into the base layer or any interlayer present in the inventive process by, for example, printing on, pressing on, pressing in, rolling on, knifecoating on, spreadcoating on, dipping, spraying or pouring on.

The suspension used for producing the interlayer preferably comprises at least one sol, which acts as an inorganic adhesive and comprises at least particles of an inorganic component which comprises essentially at least one compound of at least one metal, at least one semimetal or at least one mixed metal with at least one element of the 3rd to 7th main group. Preferably, the suspension comprises particles at least of one oxide of aluminum, of silicon, of titanium, of yttrium and/or of zirconium and at least one sol of the elements Al, Zr, Ti, Y and/or Si and is produced by suspending the particles in at least one of these sols. The suspension may comprise particulate or polymeric sols. The suspension preferably comprises a polymeric sol, especially a polymeric sol of a silicon compound.

The sols can be obtained by hydrolyzing at least one precursor compound of the elements Zr, Al, Ti, Y and/or Si with water or an acid or a combination of these compounds. It can similarly be advantageous for the compound to be hydrolyzed to be introduced into alcohol or an acid or a combination of these liquids. The compounds to be hydrolyzed are preferably present in solution in an anhydrous solvent, preferably alcohol, and are hydrolyzed with from 0.1 to 100 times and preferably from 1 to 5 times the molar ratio of water.

The compound to be hydrolyzed is preferably at least one nitrate, one halide (chloride), one carbonate or one alkoxide compound of the elements Zr, Al, Ti, Y and/or Si and preferably Si. It is particularly preferable for the compounds to be hydrolyzed to be alkoxysilanes, especially tetraethoxysilane (TEOS). The hydrolysis is preferably carried out in the presence of liquid water, water vapor, ice or an acid or a combination of these compounds.

In one version of the embodiment for producing the interlayer (3) of the inventive process, particulate sols are produced by hydrolysis of the compounds to be hydrolyzed. These particulate sols are so called because the compounds formed by hydrolysis in the sol are present in particulate form. Particulate sols can be prepared as described above or as in WO 99/15262. These sols customarily have a very high water content, which is preferably above 50% by weight. It can be advantageous for the compound to be hydrolyzed to be introduced into alcohol or an acid or a combination of these liquids prior to hydrolysis. The hydrolyzed compound may be peptized by treatment with at least one organic or inorganic acid, preferably with a 10-60% organic or inorganic acid, more preferably with a mineral acid selected from sulfuric acid, hydrochloric acid, perchloric acid, phosphoric acid and nitric acid or a mixture thereof.

In a further version of the embodiment for producing the interlayer (3) of the inventive process, polymeric sols are produced by hydrolysis of the compounds to be hydrolyzed. These polymeric sols are so called because the compounds formed by hydrolysis in the sol are present in polymeric form, i.e., in the form of chains crosslinked across a relatively large space. Polymeric sols customarily contain less than 50% by weight and preferably very much less than 20% by weight of water and/or aqueous acid. To obtain the preferred fraction of water and/or aqueous acid, the hydrolysis is carried out in such a way that the compound to be hydrolyzed is hydrolyzed with from 0.5 to 10 times the molar ratio and preferably with half the molar ratio of liquid water, water vapor or ice, based on the hydrolyzable group of the hydrolyzable compound. The amount of water used can be up to 10 times in the case of compounds which are very slow to hydrolyze, such as tetraethoxysilane for example. A hydrolysis with less than the preferred amount of liquid water, water vapor or ice likewise leads to good results, although using more than 50% less than the preferred amount of half the molar ratio is possible but not very sensible, since hydrolysis will no longer be complete and coatings based on such sols would not be very stable.

To produce these sols having the desired very low fraction of water and/or acid in the sol, it is advantageous for the compound to be hydrolyzed to be dissolved in an organic solvent, especially ethanol, isopropanol, butanol, amyl alcohol, hexane, cyclohexane, ethyl acetate and/or mixtures thereof, before the actual hydrolysis is carried out. A sol thus produced can be used for producing the inventive suspension or else as an adhesion promoter in a pretreatment step.

Both particulate sols and polymeric sols are useful as a sol in the process for producing the suspension. As well as sols obtainable as just described, it is in principle also possible to use commercially available sols, for example silica sols (such as, say, Levasil, Bayer AG). The process for producing the ceramic interlayer is in line with the processes for producing ceramic membranes which are described in DE 101 42 622 and in similar form in WO 99/15262.

It has been found that a sol system or a suspension whose wetting behavior has been adapted to the base material or to the material of any interlayer present will completely penetrate the base materials and so provide defect-free coatings. In the process it is therefore preferable to adapt the wetting behavior of the sol or suspension. This is preferably accomplished by producing polymeric sols or suspensions from polymeric sols, these sols comprising one or more alcohols, for example, methanol, ethanol or propanol or mixtures comprising one or more alcohols and also, preferably, aliphatic hydrocarbons. But other solvent mixtures are conceivable as well for addition to the sol or suspension in order that the wetting behavior thereof may be adapted to the base material used.

It has been determined that the fundamental change in the sol system and in the suspension resulting therefrom leads to a distinct improvement in the adhesion properties of ceramic components on and, if appropriate, in the base layer. Such good adhesivities are normally not obtainable with particulate sol systems. Therefore, the base materials used according to the present invention are preferably coated by means of suspensions which are based on polymeric sols.

The ceramic interlayer (3) is particularly preferably produced in the inventive process by employing suspensions wherein the mass fraction or the suspended component is from 1.5 to 150 times and more preferably from 5 to 20 times that of the solid component present in the sol. The components to be suspended can be one or more varieties of particles mentioned in the description of the interlayer. The component to be suspended can be in particular aluminum oxide particles, which are for example on offer from Martinswerke under the designations MZS 3 and MZS 1 and from AlCoA under the designation CT3000 SG, CL3000 SG, CT1200 SG, CT800SG and HVA SG.

The use of commercially available oxide particles has been observed to lead in certain circumstances to unsatisfactory results, since the particle size distribution is frequently very broad. Preference is therefore given to using metal oxide particles which have been classified by a conventional process, for example air classification and hydroclassification.

To improve the adhesion of the inorganic components to the base material, but also to improve the adhesion of the ceramic coating (2) to be applied later or of further interlayers, it can be advantageous for the suspensions used to be admixed with further adhesion promoters, for example organofunctional silanes, for example the Degussa silanes AMEO (3-aminopropyltriethoxysilane), GLYMO (3-glycidyloxytrimethoxysilane), MEMO (3-methacryloyloxypropyltrimethoxysilane), Silfin (vinylsilane+initiator+catalyst), VTEO (vinyltriethoxysilane). The admixing of adhesion promoters is preferable in the case of suspensions based on polymeric sols. Useful adhesion promoters are generally speaking in particular compounds selected from the octylsilanes, the vinylsilanes, the amine-functionalized silanes and/or the glycidyl-functionalized silanes. Particularly preferred adhesion promoters are amine-functionalized silanes for polyamides and glycidyl-functionalized silanes for polyesters. Other adhesion promoters can be used as well, but they have to be adapted to the particular base materials. The adhesion promoters have to be chosen such that the solidification temperature is below the melting or softening temperature of the material used as base layer and below the decomposition temperature of any interlayer materials present. Preferably, inventive suspensions contain very much less than 25% by weight and preferably less than 10% by weight of compounds capable of acting as adhesion promoters. An optimal fraction of adhesion promoter results from coating the base layer and/or particles with a monomolecular layer of adhesion promoter. The amount in grams of adhesion promoter required for this purpose can be obtained by multiplying the amount (in g) of the oxides or fibers used by the specific surface area of the materials (in $m^2\ g^{-1}$) and then dividing by the specific area required by the adhesion promoters (in $m^2\ g^{-1}$), the specific area required frequently being in the range from 300 to 400 $m^2\ g^{-1}$.

The suspension present on and/or in the base material or interlayer as a result of having been applied thereto can be solidified by heating to a temperature in the range from 50 to 650° C. and preferably in the range from 50 to 350° C. for example. The maximum allowable temperature is determined by the materials present in the base layer or in the interlayers. Thus, depending on the embodiment of the process, the suspension present on or in the base material is solidified by heating to a temperature in the range from 80 to 250° C. and most preferably by heating to a temperature in the range from 120 to 180° C. It can be advantageous for the heating to be to a temperature in the range from 50 to 350° C. for 1 second to 120 minutes. It is particularly preferable to solidify the suspension by heating to a temperature in the range from 80 to 250° C. and most preferably at a temperature in the range from 120 to 180° C. and preferably for 10 seconds to 60 min. Heating the suspension to solidify it is preferably done at a temperature in the range from 120 to 180° C. for 0.1 to 10 minutes on a paper comprising fibers composed of cellulose, at a temperature in the range from 500 to 550° C. for 0.5 to 10 minutes on a glass fiber web comprising fibers composed of E-glass or S-glass and at a temperature in the range from 600 to 650° C. for 0.5 to 10 minutes on a nonwoven comprising fibers composed of ceramic. The heating of the assembly can be effected by means of heated air, hot air, infrared radiation or by other heating methods according to the prior art.

In a preferred embodiment of the process for producing the interlayer to form the ceramic interlayer (3), at least one mixture composed of one or more oxide particles and one or more silanes is applied and subsequently solidified by at least single heating. This embodiment utilizes a mixture comprising a suspension composed of a sol and at least one fraction of oxide particles preferably selected from the oxides of the elements Al, Zr, Ti, Y and/or Si, to which suspension has been added prior to application a mixture of at least two different adhesion promoters which are each based on an alkylalkoxysilane of the general formula IV $$R_x\text{-Si(OR)}_{4-x} \qquad (IV)$$

where x=1 or 2 and R=organic radical, the radicals R being the same or different,
wherein the adhesion promoters are selected such that both the adhesion promoters comprise alkyl radicals which at least each comprise a reactive group as a substituent, wherein the reactive group on the alkyl radical of one adhesion promoter reacts with the reactive group of the other adhesion promoter during the at least single heating to form a covalent bond, or one or more adhesion promoters as per the formula IV, which have reactive groups which are capable of reacting under the action of UV radiation to form a covalent bond, wherein on addition of an adhesion promoter which reacts under the action of UV radiation at least one treatment with UV radiation is carried out after the suspension has been applied to the polymeric nonwoven. The treatment with UV radiation can be effected for example by means of a UV lamp, in which case the amount of energy received has to be sufficient to ensure crosslinking of the adhesion promoters. A corresponding treatment can be effected for example by irradiation with a mercury vapor lamp having a wavelength of 254 nm for 0.1 to 24 hours and preferably 1 to 4 hours. The treatment with UV radiation can be carried out before or after the at least single heating. Preferably, the UV treatment is carried out after the suspension has been applied to the base layer (1) or to any interlayers present and for the single heating of the suspension to solidify same. It is particularly preferable to carry out the treatment with UV radiation after a first heating of the suspension on the base layer/interlayer to incipiently dry/predry the suspension and before a second heating whereby the suspension is solidified. The predrying can be carried out for example at a temperature in the range from 50 to 90° C. and preferably in the range from 60 to 85° C. for a period which is preferably in the range from 0.1 to 3 hours and more preferably in the range from 0.5 to 1.5 hours. The heating to solidify the suspension can be carried out in the abovementioned temperature range.

Useful adhesion promoters include in principle all adhesion promoters which satisfy the abovementioned formula IV and where at least two adhesion promoters each comprise an alkyl radical which is capable of entering into a chemical reaction with the alkyl radical of the other adhesion promoter to form a covalent bond. In principle, all chemical reactions are feasible, but an addition or condensation reaction is preferable. The adhesion promoters may each comprise two or one alkyl radical (x in formula IV being 1 or 2). Preferably, the adhesion promoters used in the inventive process which have a reactive group on the alkyl radical comprise just one alkyl radical (x=1). The at least two adhesion promoters employed in the inventive process can be for example an adhesion promoter having an amino group on the alkyl radical and an adhesion promoter having a glycidyl group on the alkyl radical. It is particularly preferable for the inventive process to employ 3-aminopropyltriethoxysilane (AMEO) and 3-glycidyloxytrimethoxysilane (GLYMO) as adhesion promoters. Preferably, the molar ratio of the two adhesion promoters to each other is in the range from 100:1 to 1:100 and preferably in the range from 2:1 to 1:2 and most preferably about 1:1.

Methacryloyloxypropyltrimethoxysilane (MEMO) is preferably used as UV-active adhesion promoter which is capable of forming a covalent bond between the adhesion promoter molecules under the action of UV radiation. The adhesion promoters are available from Degussa AG for example.

To obtain a sufficiently stable network, the suspension used for producing the ceramic interlayer (3) preferably has an adhesion promoter content in the range from 0.1 to 20 mass %, preferably in the range from 2 to 10 mass %. As well as the "reactive" adhesion promoters mentioned, the suspension may comprise further adhesion promoters selected from the organofunctional silanes. These adhesion promoters can likewise be present in the suspension at a fraction in the range from 0.1 to 20 mass % and preferably at a fraction in the range from 2 to 10 mass %.

The process for producing this first assembly from base material and interlayer can be carried out for example by unrolling the material which forms the base material and which optionally already comprises further interlayers of a roll, passing it at a speed in the range from 1 m/h to 2 m/s, preferably at a speed in the range from 0.5 m/min to 20 m/min and most preferably at a speed in the range from 1 m/min to 5 m/min through at least one apparatus which applies the suspension onto and into the base layer, such as a roller, a sprayer or a doctor knife for example, and at least one further apparatus which enables the suspension to be solidified on and/or in the base layer by heating, for example an electrically heated oven, and rolling up the thus produced assembly on a second roll. This makes it possible to produce this assembly in a continuous process.

Color-conferring steps and decorating steps can be carried out at various points of the inventive process. For instance, the base layer and/or the interlayer(s) can be colored. For this can be used all common, commercially available colors and processes, for example screen printing, ink jet printing or gravure printing. It is also possible to texture the inventive wallcovering assemblies by endowing them with a three-dimensional surface. For instance, plies of sawdust or similar texture-conferring materials can have been provided as an interlayer and be applied accordingly. These interlayers comprise the customary adhesive/binder materials whereby the particles can be bound to the underlying material. Similarly, layers which are obtainable by foaming, such as vinyl foam layers for example, can be applied as interlayers according to the prior art. The foamed layers can be obtained for example by the addition of a gas-detaching compound such as, for example, carbonates, bicarbonates or azo compounds, or else by the injection of blown gases.

As already observed, it can be advantageous to apply further interlayers between the layers (1) and (2) and/or (2) and (3) or within the base material (1). The interlayers may contain for example an adhesive or an adhesion promoter or a binder. The interlayers can similarly comprise pigments, dyes or the like which are suitable for coloration or for reproduction of patterns, script characters and graphics or photographs. The interlayers can be continuous or be present exclusively at those points on the underlying layer where there is to be a pattern, image or character or a texturing structure.

In the simplest case, interlayers which add visual interest can be applied by commercially available printers. For instance, they can be applied using an ink jet printer or a printer which operates according to the thermal transfer process. Such printers can be used to apply binders, adhesives or adhesion promoters as well as colors or pigments.

The individual layers of the inventive wallcovering assemblies can be applied in a roll-to-roll process. Roll-to-roll in the realm of the present invention refers to a process wherein a base material is unrolled off a roll, one or more layers are applied in a continuous process and the finished product or else intermediate products can be wound up on a second roll. The production of the inventive wallpapers by a roll-to-roll process has the advantage that the finished product is already in roll form, in which form it is customarily processed.

The process for producing the inventive wallcovering assembly can be carried out for example by unrolling the base material (1) off a roll, passing it at a speed in the range from 1 m/h to 2 m/s, preferably at a speed in the range from 0.5 m/min to 20 m/min and most preferably at a speed in the range from 1 m/min to 5 m/min through at least one apparatus which applies the suspension for producing the ceramic coating (2) onto and, if appropriate, into the base material (1), such as a roller, a sprayer or a doctor knife for example and at least one further apparatus which enables the suspension to be solidified on and in the base material by heating, for example an electrically heated oven, and rolling the thus produced assembly up on a second roll. A particularly preferred embodiment employs further apparatuses for applying, distributing and heating or heating and distributing and also for cooling, so that, in a single step, initially the ceramic interlayer or optionally both before and/or afterwards further interlayers are applied and subsequently the ceramic coating/top layer (2) is applied before the assembly is wound up on the second roll. This way makes it possible to produce the wallpaper simply in a continuous process.

The inventive process can also be carried out at different times and different locations. It is thus possible first to produce the base layer (1) with the ceramic interlayer (3) and optionally one or more interlayers between the layer (1) and the interlayer (3) optionally on the ceramic interlayer (3) as well. This intermediate product can then be endowed in a printing plant with a further interlayer, the print layer or, in the case of multicolored printing, the printed layers. The printing can be done on machines known for wallpaper production and according to processes known for wallpaper production. Following this process step, the inventive ceramic coating/top layer (2) is applied to the printed assembly according to one of the processes mentioned above in order that the inventive wallcovering assembly may be obtained.

The inventive wallcovering assemblies can be applied to all substrates and in all sectors of building construction, especially in the sector of interior decoration. Owing to the good thermal and chemical stability, employment in sectors having heightened safety requirements such as laboratories for example is possible as well. The inventive wallcovering assemblies are also very useful in cases where a certain fire behavior or cleaning behavior is desired, as in public means of transport for example.

Figure 1:
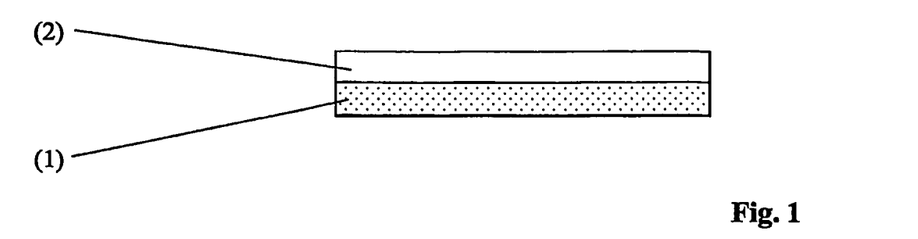

FIG. 1 depicts by way of example the construction of an inventive wallcovering assembly. A base material (1) supports a ceramic coating (2) as a top layer.

Figure 2:
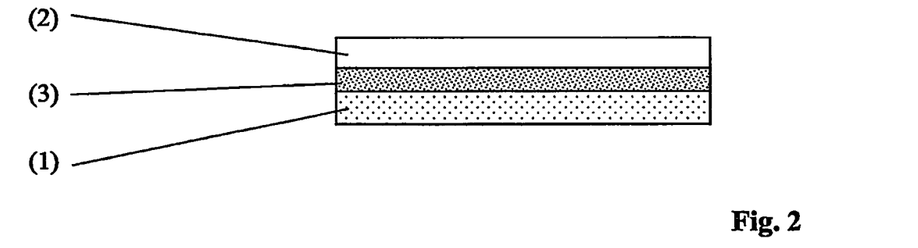

FIG. 2 depicts by way of example the construction of an inventive wallcovering assembly. A base material (1) supports a ceramic interlayer (3). This ceramic interlayer (3) supports a third layer, the top layer or ceramic coating (2), which normally forms the uppermost layer of the assembly.

Figure 3:
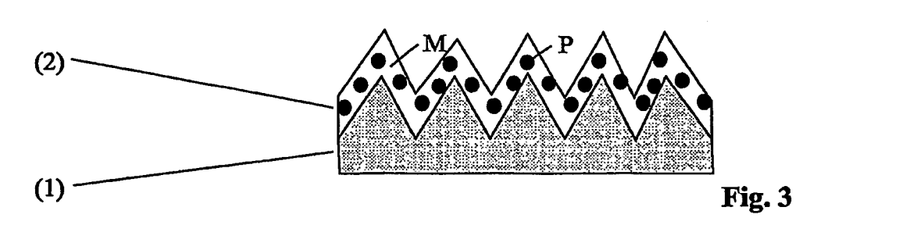

FIG. 3 depicts schematically the section through the surface of an inventive wallcovering assembly where the surface texture is formed by the texture of the base material and not by the particles (P) in the matrix (M) of the top layer (2).

Figure 4:
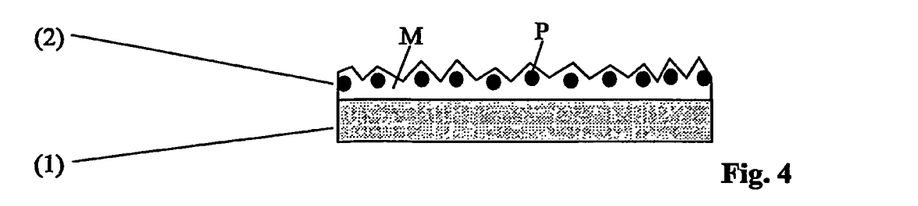

FIG. 4 depicts schematically a section through the surface of an inventive wallcovering assembly where the surface texture is formed not by the texture of the base material but by the particles (P) in the matrix (M) of the top layer (2).

The present invention is more particularly described by the examples which follow without the scope of the claims and the description being restricted by the examples.

EXAMPLE 1

Production of a Top Layer (2)

Component 1

224 g of GLYEO dynasylane, Degussa AG, were placed into a 1000 ml glass beaker. 20 g of 1% by weight hydrochloric acid were added with stirring at room temperature on a magnetic stirrer plate using a magnetic stirrer bar, stirring being continued until the solution became clear. 325.6 g of a 15% by weight dispersion of Aerosil R812S (Degussa AG) in ethanol were added with continued stirring at 400 rpm. The first component was thus ready to use.

Component 2

190 g of AMEO dynasylane (Degussa AG).

Production of Ready-to-Use Suspension

Component 2 was gradually added dropwise to component 1 through a dropping funnel over a period of 20 min with monotonous stirring. The suspension is now ready for processing. The pot life was 9 days at room temperature.

Processing

The ready-to-use suspension was knifecoated by means of a Mathis hand pull frame at 25 µm on a wallpaper base (paper web having a PET content of about 10% by weight) or a PET nonwoven from Freudenberg having a thickness of 220 µm and a basis weight of 50 g/m² (PET FFKH 7210) and subsequently heated for 30 minutes at 120° C. (wallpaper base) or 140° C. (PET nonwoven). The wallcovering assembly thus obtained was then subjected to material testing.

EXAMPLE 2

Production of a Top Layer (2)

Component 1

226.09 g of GLYMO dynasylane, Degussa AG, were placed in a 500 ml glass beaker. 11.46 g of 1% by weight hydrochloric acid were added with stirring using a magnetic stirrer plate and a magnetic stirrer bar.

Component 2

87 g of bisphenol A were introduced as an initial charge. 9.65 g of Aerosil R812S (silica from Degussa AG) were added with continued stirring at 400 rpm. This batch was covered over and stirred for 20 hours. 7.63 g of 1-methylimidazole activator were slowly added with stirring.

Production of Ready-to-Use Suspension

Component 2 was gradually added dropwise to component 1 through a dropping funnel over a period of 20 min with monotonous stirring. The suspension is now ready for processing. The pot life was 4 days at +4° C.

Processing

Processing was done as in Example 1.

EXAMPLE 3

Production of a Ceramic Layer (3)

67.5 g of CT 3000 SG alumina (AlCoA), 7.5 g of ethanol, 15 g of 5% by weight nitric acid, 0.05 g of 2-(2-(2-methoxyethoxy)ethoxy)acetic acid (TODS), 1.25 g of tetraethoxysilane (TEOS), 2.5 g of GLYMO and 1.25 g of methyltriethoxysilane (MTES) are mixed at room temperature and 400 revolutions per minute rpm on a magnetic stirrer plate for 24 hours. The suspension thus obtained was knifecoated onto the PET nonwoven in a thickness of 50 μm as per Example 1 and the assembly thus obtained was heated at 130° C. for 30 minutes.

EXAMPLE 4

Production of an Assembly Comprising Not Only a Ceramic Layer (3) But Also a Top Layer (2)

The assembly which is obtained as per Example 3, from base material (1) and ceramic layer (3), was used as a base material in a process as per Example 1 and provided with a top layer (2) accordingly.

EXAMPLE 5

Production of an Assembly Comprising Not Only a Ceramic Layer (3) But Also a Top Layer (2)

The assembly which is obtained as per Example 3, from base material (1) and ceramic layer (3), was used as a base material in a process as per Example 2 and provided with a top layer (2) accordingly.

COMPARATIVE EXAMPLE (POT LIFE)

226.09 g of GLYMO, 87 g of bisphenol A, 11.46 g of 1% hydrochloric acid, 9.56 g of Aerosil R972, 7.63 g of 1-methylimidazole and 7.63 g of MEMO are intimately mixed. The pot life was less than 1 day at room temperature.

Some of the wallcovering assemblies obtained in Examples 1 to 4 were used for various tests.

EN 13523-4 Pencil Hardness Test

An EN 13523-4 pencil hardness test was carried out. The hardness of the pencils used was used to determine which mechanical friction stress the assemblies are capable of withstanding. The degrees of hardness indicated below in table 1 correspond to the pencil hardnesses at which neither a scratching of the surface nor a destruction of the base material was observed. The pencils used, which differ in hardness, are designated 8B, 7B, 6B, 5B, 4B, 3B, 2B, B, HB, F, H, 2H, 3H, 5H, 6H, 7H, 8H and 9H, sorted from soft to hard.

TABLE 1

Result of EN 13523-4 pencil hardness test

| Base material | Ceramic layer (3) | Top layer (2) as per example | Degree of hardness to surface damage |
|---|---|---|---|
| PET nonwoven (Example 3) | yes | none | 4 B |
| PET nonwoven (Example 4) | yes | 1 | B |
| PET nonwoven (Example 5) | yes | 2 | 8 H |
| Wallpaper base | none | none | B |
| Wallpaper base (Example 2) | none | 2 | 8 H |

The EN 13523-4 pencil hardness test shows that a topcoating with the 2-component system as per Example 2 distinctly improves the surface resistance to scratching stresses as per the pencil hardness test.

DIN 53 438 Part 3 Flame Exposure Test

Evaluation

F1: The upper measuring mark is not reached by the flame front of the burning specimen (specimen extinguishes earlier)
F2: Flame front of burning specimen reaches the upper measuring mark in 20 seconds or later
F3: Flame front of burning specimen reaches the upper measuring mark in less than 20 seconds.

Result of Test of Fire Behavior

An uncoated PET nonwoven, 220 μm in thickness, 50 g/m² from Freudenberg (PET FFKH 7210) melts during flame exposure and thus has to be rated F3.

A PET nonwoven with a ceramic layer (3) as per Example 3 shows holing in the flame-exposed region but no afterburning and thus has to be rated F1.

A PET nonwoven with a ceramic layer (3) and a top layer (2) as per Example 4 shows holing in the flame-exposed region but likewise no afterburning and thus likewise has to be rated F1.:F1 (holing in flame-exposed region, but no afterburning).

The aforementioned tests show that inventive wallcovering assemblies which comprise a ceramic coating as a topcoating layer have a surface which is notable for good scratch resistance and good fire behavior (low flammability).

What is claimed is:

1. A wallcovering assembly, comprising:
   a base material,
   at least one ceramic coating comprising ceramic particles selected from the group consisting of oxides of metals, oxides of semimetals, nitrides of metals, nitrides of semimetals, borides of metals, borides of semimetals, carbides of metals and carbides of semimetals embedded in a matrix consisting of a silicon network linked together by Si—O—Si bridges,
   and one or more ceramic interlayers present between the base material and the ceramic layer,
   wherein the ceramic interlayer contains particles of an inorganic component comprising essentially at least one component selected from the group consisting of at least one metal, at least one semimetal and at least one mixed metal with at least one element of the third to seventh main group that are bonded by at least one inorganic adhesive to each other and to the layer present underneath the ceramic interlayer, and
   wherein at least one of the ceramic coating and the ceramic interlayer comprise an inorganic-organic silicon network including an organic component covalently bonded between the Si atoms and wherein the organic component has a hydroxyl group and an amine group and a structural unit of the following formula (II):

wherein $R^{10}$ is an organic radical.

2. The wallcovering assembly of claim 1, wherein the ceramic coating comprises POSS clusters or hydrophobicized silicas as particles.

3. The wallcovering assembly of claim 1, wherein the ceramic coating is transparent to electromagnetic radiation having a wavelength in the region of visible light.

4. The wallcovering assembly of claim 1, wherein the ceramic interlayer comprises particles of oxides selected from the group consisting of $Al_2O_3$, $ZrO_2$, $TiO_2$ and $SiO_2$ having an average particle size from 200 nm to 5 µm, and a silicon network,
  wherein the silicon of the network is bonded via oxygen atoms to the oxides of the ceramic coating, via organic radicals to the layer underneath the ceramic coating and via at least one chain of carbon atoms to a further silicon.

5. The wallcovering assembly of claim 1, wherein $R^{10}$ is a substituted or unsubstituted alkyl, aryl, acyl or alkylaryl radical.

6. The wallcovering assembly of claim 1, wherein $R^{10}$ is a dimethylmethylene radical.

7. The wallcovering assembly of claim 1, which consists of the base material, the ceramic coating and the ceramic interlayer.

8. A wallcovering assembly, consisting of:
  a base material,
  at least one ceramic coating comprising ceramic particles selected from the group consisting of oxides of metals, oxides of semimetals, nitrides of metals, nitrides of semimetals, borides of metals, borides of semimetals, carbides of metals and carbides of semimetals embedded in a matrix consisting of a silicon network linked together by Si—O—Si bridges, and one or more ceramic interlayers present between the base material and the ceramic coating, wherein the ceramic interlayer contains particles of an inorganic component comprising essentially at least one component selected from the group consisting of at least one metal, at least one semimetal and at least one mixed metal with at least one element of the third to seventh main group that are bonded by at least one inorganic adhesive to each other and to the layer present underneath the ceramic interlayer, wherein at least one of the ceramic coating and the ceramic interlayer comprise an inorganic-organic silicon network including an organic component covalently bonded between the Si atoms and wherein the organic component has a hydroxyl group and an amine group.

* * * * *